(12) United States Patent
Sato et al.

(10) Patent No.: US 7,245,808 B2
(45) Date of Patent: Jul. 17, 2007

(54) OPTICAL ELEMENT

(75) Inventors: Akinobu Sato, Tokyo (JP); Akiko Suzuki, Tokyo (JP); Emmanuel Bourelle, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 11/473,090

(22) Filed: Jun. 21, 2006

(65) Prior Publication Data

US 2006/0291780 A1 Dec. 28, 2006

(30) Foreign Application Priority Data

Jun. 27, 2005 (JP) ............................. 2005-186044

(51) Int. Cl.
*G02B 6/10* (2006.01)
(52) U.S. Cl. ........................ 385/129; 385/130; 385/131
(58) Field of Classification Search ................. 385/129
See application file for complete search history.

(56) References Cited

U.S. PATENT DOCUMENTS

2004/0258383 A1* 12/2004 Sato et al. .................. 385/129

FOREIGN PATENT DOCUMENTS

| JP | 11-072607 | 3/1999 |
| JP | 2000-171763 | 6/2000 |
| JP | 2001-272555 | 10/2001 |

* cited by examiner

*Primary Examiner*—Jennifer Doan
(74) *Attorney, Agent, or Firm*—David N. Lathrop, Esq.; Gallagher & Lathrop (57) ABSTRACT

An optical element includes: a conductive film having a through opening and a periodic uneven structure (grooves) formed in a surface thereof; and a photonic crystal. The grooves are formed around the through opening, the photonic crystal has an optical waveguide and a defect structure (point defect) optically coupled to the optical waveguide formed therein, the conductive film is disposed opposite to the photonic crystal, and the through opening is opposite to the point defect.

9 Claims, 7 Drawing Sheets

TABLE 1

| | CONDUCTIVE FILM | | DIAMETER OF POINT DEFECT (μm) | DIAMETER OF INCIDENT LIGHT BEAM (μm) | INTENSITY OF LIGHT COUPLED TO OPTICAL WAVEGUIDE (PERCENTAGE TO INTENSITY OF INCIDENT LIGHT: %) |
|---|---|---|---|---|---|
| | NUMBER OF GROOVES | DIAMETER OF OPENING (μm) | | | |
| EXAMPLE 1-1 | 3 | 0.6 | 0.47 | 6.0 | 22 |
| EXAMPLE 1-2 | 4 | 0.6 | 0.47 | 6.0 | 23 |
| EXAMPLE 1-3 | 3 | 0.1 | 0.47 | 6.0 | 5 |
| EXAMPLE 1-4 | 3 | 0.3 | 0.47 | 6.0 | 7 |
| EXAMPLE 1-5 | 3 | 0.4 | 0.47 | 6.0 | 8 |
| EXAMPLE 1-6 | 3 | 0.5 | 0.47 | 6.0 | 17 |
| EXAMPLE 1-7 | 3 | 0.8 | 0.47 | 6.0 | 22 |
| EXAMPLE 1-8 | 3 | 1.0 | 0.47 | 6.0 | 18 |
| EXAMPLE 1-9 | 3 | 1.4 | 0.47 | 6.0 | 17 |
| EXAMPLE 1-10 | 3 | 1.6 | 0.47 | 6.0 | 6 |
| EXAMPLE 1-11 | 3 | 0.6 | 0.47 | 10.0 | 8 |
| EXAMPLE 2 | 3 (DOUBLE-SIDED) | 0.6 | 0.47 | 6.0 | 34 |
| EXAMPLE 3 | 3 | 0.6 | 0.47 | 6.0 | 38 |
| COMPARISON EXAMPLE | — | — | 0.47 | 6.0 | 1.2 |

OPTICAL ELEMENT

BACKGROUND OF THE INVENTION

1. Field of the Invention

The present invention relates to a micro-optical element used for optical interconnection or the like. In particular, it relates to an optical element using a photonic crystal.

2. Prior Art

Photonic crystals are periodic structures composed of a periodic array of two or more materials of difference refractive indices. The period is corresponding to about half of light wavelength. Photonic crystals are drawing attention because they can highly control the behavior of light. Photonic crystals allow light to be efficiently confined in a spatial domain that is no greater than the wavelength or to be refracted at a steep angle with a low loss. Therefore, if a photonic crystal is used in an optical element, the size of the optical element can be significantly smaller than that of conventional one.

In order to put an optical element using such a photonic crystal into practical use, the optical element has to be optically coupled to an external optical system, such as an optical fiber. In Japanese Patent Application Laid-Open No. 2001-272555 (referred to as literature 1, hereinafter), there is disclosed an art of optical coupling by introducing light into a two-dimensional photonic crystal slab through a surface of the slab perpendicularly from outside thereof.

In addition, in Japanese Patent Application Laid-Open No. 11-72607 (referred to as literature 2, hereinafter) which is laid open in 1999 and Japanese Patent Application Laid-Open No. 2000-171763, there are disclosed optical transmission arts that significantly increase the transmittance of light passing through a series of openings, having a diameter smaller than the wavelength of the light, formed in a metal film.

According to this art, by forming the openings in the metal film in a periodic array, or by giving a periodic configuration associated with the openings to the metal film surface, the intensity of light applied to the metal film and passing through one or more openings in the metal film that have a diameter smaller than the wavelength is significantly increased compared with the metal film having neither such a periodic array of openings nor such a surface configuration. According to experimental verification, it is possible that the light intensity increases by a factor of 1000. It can be considered that such an increase of light intensity occurs when the light incident on the metal film interacts in a resonant manner with the surface plasmon mode excited in the metal film.

According to the method of optical coupling by introducing light into a two-dimensional photonic crystal slab through a surface of the slab perpendicularly from outside thereof, such as that described in the literature 1, the size of a defect formed in the two-dimensional photonic crystal slab to achieve optical coupling is quite smaller than the wavelength of the light used. For example, in case where the wavelength of the light is 1.5 µm, the size of the defect is about 0.5 µm. Therefore, there is a problem that the coupling loss at the defect is extremely high because a normal lens cannot condense light to a size equal to or smaller than the wavelength of the light.

On the other hand, according to the arts disclosed in the literature 2 and the like, light can quite efficiently pass through openings having a diameter smaller than the wavelength of the light. However, the light having passed through the openings spreads out naturally. In those literatures, there is not described any device that allows efficient use (optical coupling) of the light having passed through the openings with a low loss.

SUMMARY OF THE INVENTION

An optical element according to the present invention comprises: a conductive film having at least one through opening and at least one structure (referred to as "uneven structure" or "periodic uneven structure", hereinafter) which has recesses or projections, arranged in a predetermined period, formed in at least one of both surfaces thereof, and a photonic crystal, in which each uneven structure is formed around each through opening, the photonic crystal has at least one optical waveguide and at least one defect structure optically coupled to at least one of the optical waveguides formed therein, and the conductive film is disposed opposite to the photonic crystal, and each through opening is opposite to each defect structure.

In addition, the conductive film may have at least one uneven structure in the each of the both surfaces thereof, and at least one pair of the uneven structure formed in the one surface of the conductive film and the uneven structure formed in the other surface of the conductive film is formed around the through opening. In addition, a mirror may be disposed at the side of the photonic crystal opposite to the side where the conductive film is disposed.

Preferably, the through opening has a diameter smaller than the wavelength of incident light.

In addition, in the case where the through opening is a cylindrical through opening, and the defect structure is a point defect, the defect structure preferably has a diameter smaller than the diameter of the through opening. In this case, the offset between the center of the through opening and the center of the defect structure is preferably smaller than the diameter of the defect structure.

According to the present invention, the through opening may be disposed within a distance of a quarter of the period of the uneven structure from the center of the uneven structure.

In addition, the uneven structure may be concentric configuration, and the position of the through opening is at the center of the uneven structure.

DETAILED DESCRIPTION

The present invention provides an optical element that uses a photonic crystal and can achieve optical coupling within an extremely small region with an extremely low loss.

In the following, examples of the present invention will be described with reference to the drawings.

Figure 3:
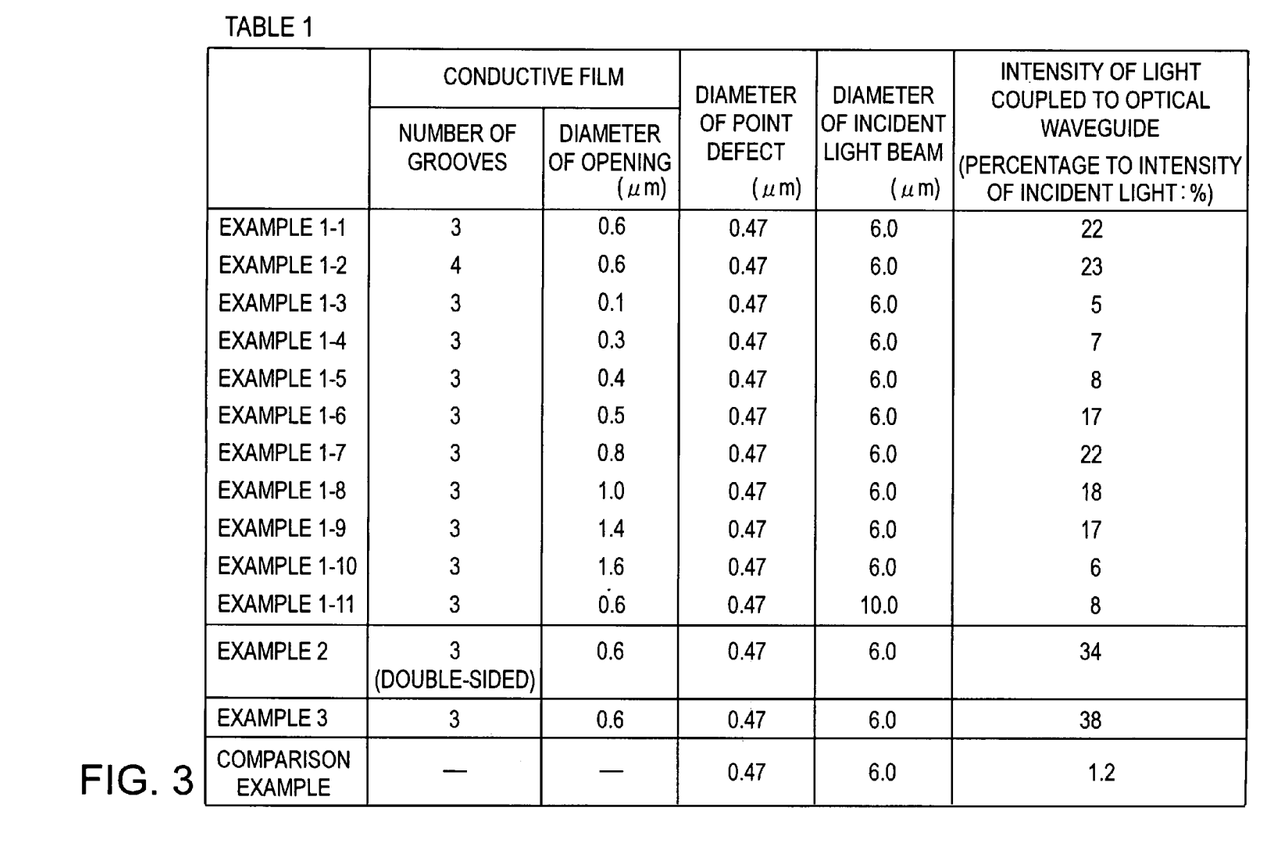
FIG. 3 is a table showing the intensity of light coupled to an optical waveguide for various examples and a comparison example.

For the convenience of illustration, not all components are denoted by reference numerals in the drawings except for FIG. 3.

EXAMPLE 1

Figure 1A:
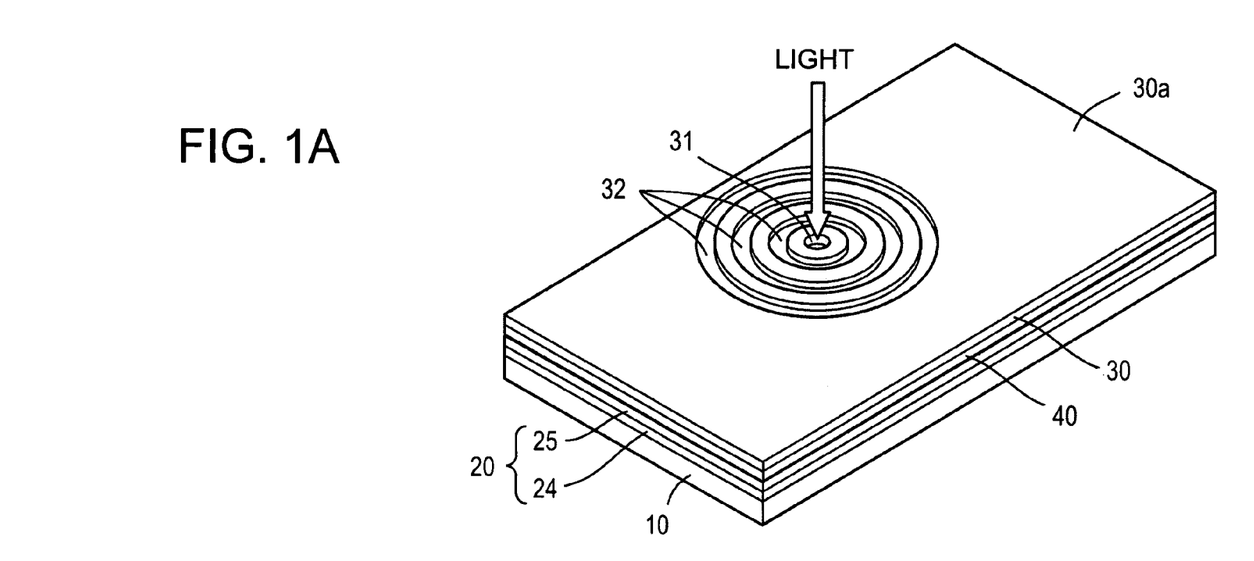
FIG. 1A is a perspective view of an optical element according to an example 1 of the present invention.
Figure 1B:
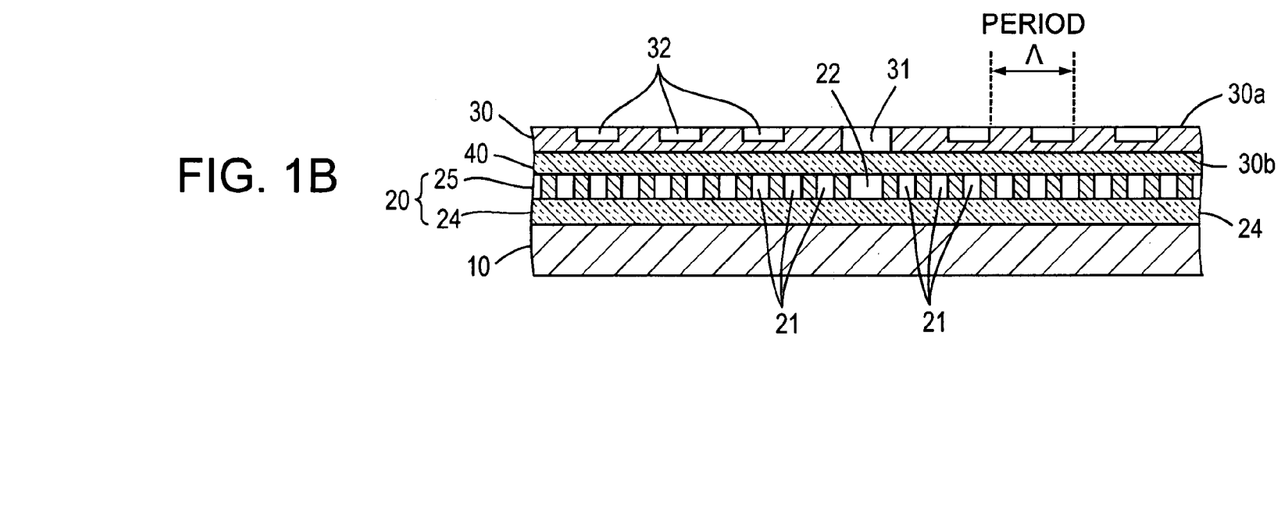
FIG. 1B is a partially enlarged cross-sectional view of the optical element according to the example 1 of the present invention.
Figure 2:
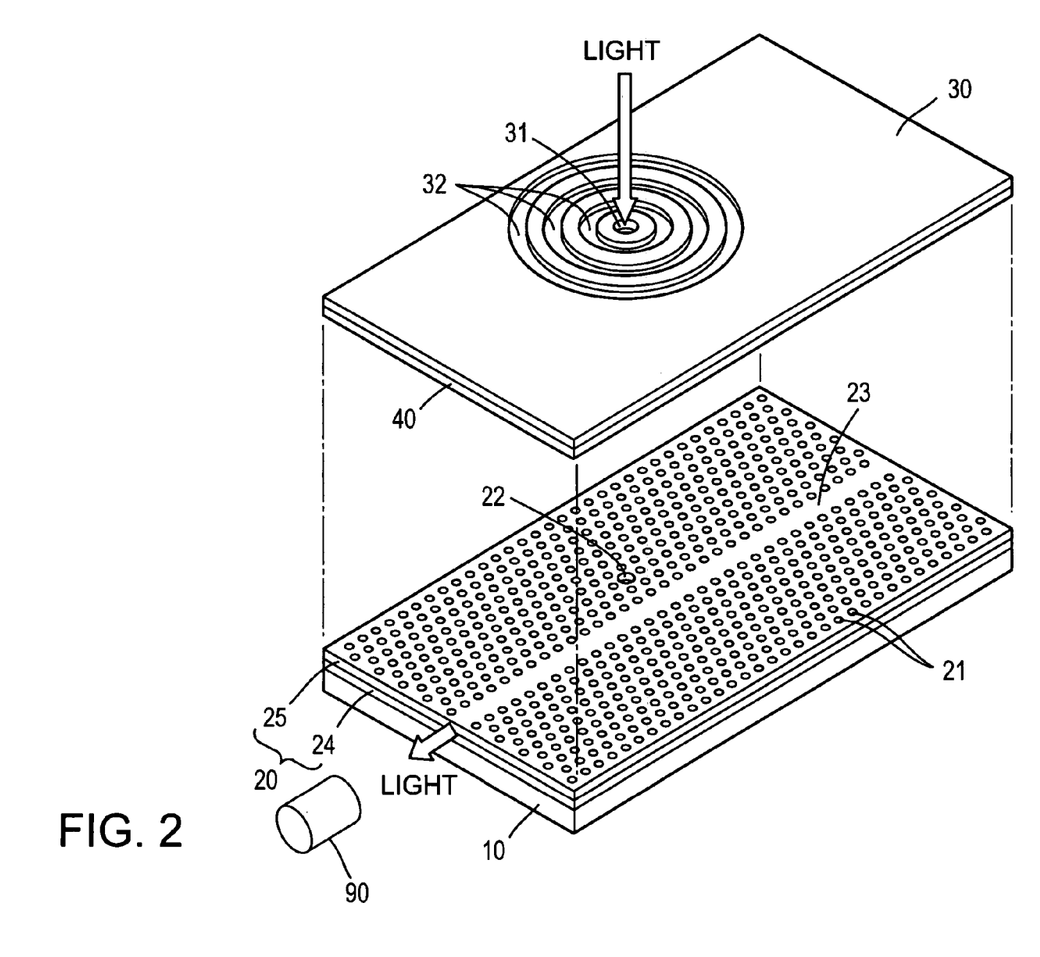
FIG. 2 is an exploded perspective view of the optical element shown in FIGS. 1A and 1B.

FIG. 1A and FIG. 1B show an optical element according to an example 1 of the present invention. The optical element comprises a substrate 10, a photonic crystal 20 formed on the substrate 10, and a conductive film 30 disposed close to the photonic crystal 20. The conductive film 30 is disposed on a substrate 40 and is located over the photonic crystal 20 (at the opposite side to the substrate 10). Then the conductive film 30 faces the photonic crystal 20 via the substrate 40. FIG. 2 shows the optical element shown in FIG. 1A and FIG. 1B divided into two parts.

First, a configuration of the conductive film 30 will be described.

The conductive film 30 has a circular opening 31 penetrating therethrough (in other words, a cylindrical through opening) and a groove 32 formed in one surface 30a thereof, which is the surface opposite to the surface facing to the substrate 10 (referred to as "upper surface", hereinafter). In FIG. 1A and FIG. 1B, concentric grooves 32 are formed around the opening 31, and thus, a periodic uneven structure is formed in the upper surface 30a of the conductive film 30. Light is applied to the upper surface 30a of the conductive film 30. The conductive film 30 is made of metal or a semiconductor material having relatively high conductivity. Preferably, aluminum, silver, gold or chromium is used for the conductive film 30, for example.

In FIG. 1A and FIG. 1B, concentric grooves 32 having a period of Λ (see FIG. 1B) are formed only in the upper surface 30a of the conductive film 30. Optionally, such grooves may be formed in the other surface 30b, which is the opposite surface to the upper surface 30a (refereed to as "lower surface", hereinafter). Furthermore, while the concentric grooves 32 are formed around the opening 31 in this example, the present invention is not limited to such a periodic uneven structure. A two-dimensional lattice of recesses or projections, or a one-dimensional array or two-dimensional lattice of grooves and ribs may be used. The uneven structure can be directly formed in the conductive film by ion milling or the like or can be formed by various types of transfer methods.

Furthermore, in FIG. 1A and FIG. 1B, the opening 31 has a circular shape. However, the opening 31 may have another shape, such as an elliptical shape or rectangular shape. If the shape of opening 31 is not circular, the center of opening may be corresponding to the center of gravity thereof. Here, defects introduced into the photonic crystal to permit light to enter the photonic crystal often have a size equal to or smaller than the wavelength of the light. In this regard, the opening 31 preferably has a diameter smaller than the wavelength. In the case where the opening 31 has an elliptical or rectangular shape, at least the length along the minor axis or at least the short side is desirably smaller than the wavelength. In a sense, it can be seen that a "diameter" of the circular opening is corresponding to the length along the minor axis of an elliptical shape or to the short side of a rectangular shape. Thus, the word of "diameter" of an opening in this description has to be grasped in the meaning described the above. The position of the opening 31 is desirably at the center of the periodic uneven structure (in other words, it is desirable that the center of the opening 31 coincides with the center of the uneven structure.) As far as the offset is equal to or less than Λ/4, no significant problem occurs. Here, the term "offset" refers to the center-to-center distance between the central axis of the opening 31 and the central axis of the uneven structure.

Now, preferred lengths of the period Λ of the uneven structure will be described, taking into consideration the surface plasmon mode. Supposed that the wavelength of the incident light is λ, the condition for effective excitation of the surface plasmon mode in the case where the light is incident perpendicularly on the surface having the uneven structure can be expressed by the following formula (1).

$$\lambda = \Lambda(\epsilon_m \epsilon_d)^{1/2}/(\epsilon_m + \epsilon_d)^{1/2} \quad (1)$$

In this formula, $\epsilon_m$ denotes the dielectric constant of the conductive film, and $\epsilon_d$ denotes the dielectric constant of a dielectric medium disposed adjacent to the conductive film.

For example, in the case where the conductive film was made of silver, and the period Λ of the uneven structure was 1500 nm, a peak of the intensity of the transmitted light appeared in the vicinity of a wavelength λ of 1580 nm. In the case where the period Λ of the uneven structure was 1300 nm, a peak of the intensity of the transmitted light appeared in the vicinity of a wavelength λ of 1370 nm. In the light of the formula (1), these results can be explained as an increase phenomenon of the transmitted light intensity because of the surface plasmon mode in the silver surface on the side of air.

In this way, the light propagating through the optical element can be suitably enhanced by adjusting the period of the uneven structure to the wavelength of light used. However, any periodic uneven structure can enhance the light compared with the case where no recesses or projections are formed, even if the period thereof is not adjusted with respect to the wavelength of the light as described above.

Furthermore, in a practical structure intended for actual manufacture, the conductive film is not always sandwiched between the same dielectric media. For example, the upper surface of the conductive film may be adjacent to air, and the lower surface may be adjacent to a base material (substrate) that supports the conductive film. In such a case, uneven structures having periods suitable for the respective dielectric media can be formed based on the formula (1).

In the following, a fabrication method of the optical element and exemplary numerical values will be described in detail.

The optical element was constructed as shown in FIGS. 1 and 2.

For fabrication of a combination of the substrate 10 and the photonic crystal 20 disposed on the substrate 10, a silicon on insulator (SOI) wafer was used that comprised: a Si substrate; a $SiO_2$ layer overlying the Si substrate; and a Si layer overlying the $SiO_2$ layer. A resist for electron beam exposure was applied to the top of the Si layer. Then, using an electron beam exposure apparatus, a resist pattern including a periodic array of circles such as shown in FIG. 2 was formed. At the same time, a line defect that includes no such circles and a defect structure (point defect) having a slightly larger diameter than the circles were formed. Then, the resist in the circles was developed and removed, thereby forming a resist pattern having circular openings. Furthermore, using a reactive ion beam etching apparatus, the Si layer was etched, thereby forming the two-dimensional photonic crystal slab. Air openings 21 formed were arranged in a triangular lattice with a period of 0.42 µm, the slab constituted by the Si layer had a thickness of 0.256 µm, the periodically arranged air openings 21 had a diameter of 0.244 µm, and a point defect 22 had a diameter of 0.47 µm. In FIG. 2, reference numeral 23 denotes an optical waveguide formed by the line defect, and the point defect 22 is formed to be optically coupled to the optical waveguide 23. In addition, reference numeral 24 denotes the SiO$_2$ layer, and reference numeral 25 denotes the Si layer.

Then, as the conductive film 30, a silver film was deposited to a thickness of 0.3 µm on the substrate 40 by DC sputtering. The substrate 40 was made of SiO$_2$ and had a thickness of 0.3 µm. The concentric grooves 32 having a period of 1.5 µm and a depth of 0.2 µm were formed in the conductive film 30, namely the silver film in this example, by focused ion beam (FIB) processing, thereby forming the uneven structure. The width of the grooves 32 had just half length of the one period of Λ. The number of grooves 32 was 3 or 4 in examples 1-1 to 1-11 shown in the table 1 in FIG. 3. Then, the opening 31 was formed at the center of the concentric grooves 32 by FIB processing, the diameter of the opening 31 ranging from 0.1 µm to 1.6 µm in the examples 1-1 to 1-11 shown in the table 1 in FIG. 3.

The substrate 40 having the conductive film 30, configured like above explanation, formed thereon was applied to the surface of the photonic crystal 20 by an electrostatic bonding technique, thereby forming the optical element. At this time, the substrate 40 and the photonic crystal 20 were aligned to each other so that the center of the point defect 22 in the photonic crystal 20 coincides with the center of the opening 31 in the conductive film 30.

Laser light having a wavelength of 1.587 µm, which is suitable for the point defect 22 in the photonic crystal 20, was introduced into the opening 31 in the fabricated optical element, and the intensity of light coupled to the optical waveguide 23 in the photonic crystal 20 was monitored with a photodiode 90. The result is shown in the table 1 in FIG. 3. The intensity of light coupled to the optical waveguide 23 is represented in terms of percentage to the intensity of the incident light. The photodiode 90 was disposed to face one longitudinal end of the optical waveguide 23.

EXAMPLE 2

Now, an example 2 will be described with reference to the drawings.

Figure 4:
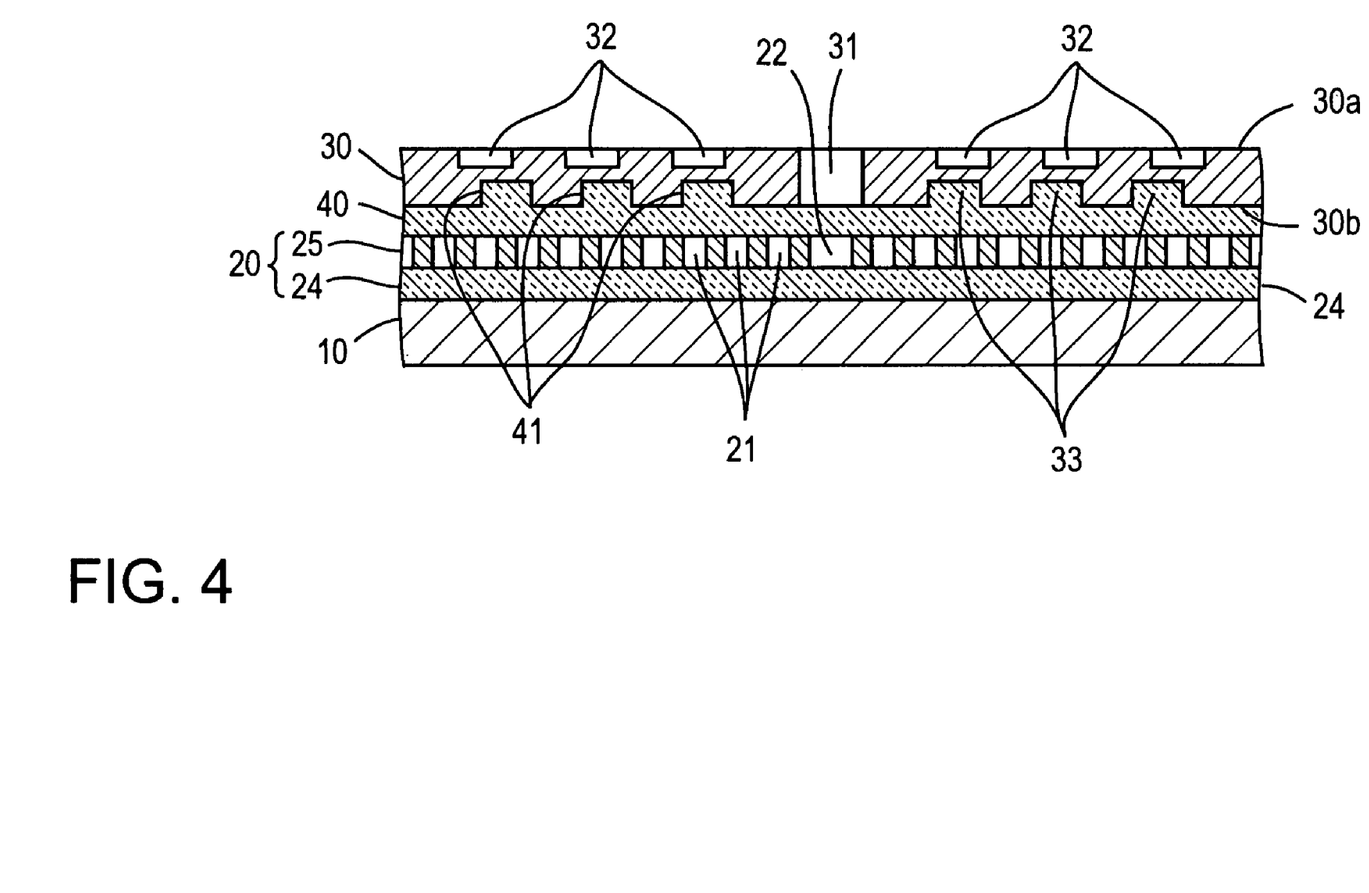
FIG. 4 is a cross-sectional view of an optical element according to an example 2 of the present invention.

FIG. 4 shows an arrangement of essential parts of an optical element according to the example 2 of the present invention in the same manner as FIG. 1B. In this optical element, concentric grooves 32 and 33 are formed in an upper surface 30a and a lower surface 30b of a conductive film 30, respectively. That is, the conductive film 30 has periodic uneven structure formed in both the surfaces thereof. The optical element thus configured was fabricated in the same manner as in the example 1 except that the uneven structure are formed in both the surfaces of the conductive film 30.

In a substrate 40 made of SiO$_2$, on which the conductive film 30 was to be formed, an uneven structure was formed by FIB processing. Thus, an arrangement of concentric projections 41 having a height of 0.2 µm and a period of 1.4 µm was formed on the substrate 40. The width of the projections 41 had just half length of the one period, and the number of the projections 41 was 3. Then, a silver film was formed on the substrate 40 by DC sputtering. Thus, three concentric grooves 33 having a height of 0.2 µm corresponding to the projections 41 were formed in the lower surface 30b of the conductive film 30.

Then, in the upper surface 30a of the conductive film 30, concentric grooves 32 having a depth of 0.2 µm and a period of 1.5 µm were formed with the center aligned with the center of the concentric grooves 33 formed in the lower surface 30b using FIB processing. The width of the grooves 32 had just half length of the one period, and the number of the grooves 32 was 3. Then, an opening 31 having a diameter of 0.6 µm was formed at the center of the grooves 32 by FIB processing.

The substrate 40 having the conductive film 30, configured like above explanation, formed thereon was applied to the surface of the photonic crystal 20 having the same structure as in the example 1 by an electrostatic bonding technique, thereby forming the optical element. At this time, the substrate 40 and the photonic crystal 20 were aligned to each other so that the center of the point defect 22 in the photonic crystal 20 coincides with the center of the opening 31 in the conductive film 30.

As in the example 1, laser light having a wavelength of 1.587 µm was introduced into the opening 31 in the fabricated optical element, and the intensity of light coupled to the optical waveguide 23 was monitored with a photodiode 90. The result is shown in the table 1.

EXAMPLE 3

Now, an example 3 will be described with reference to the drawings.

Figure 5:
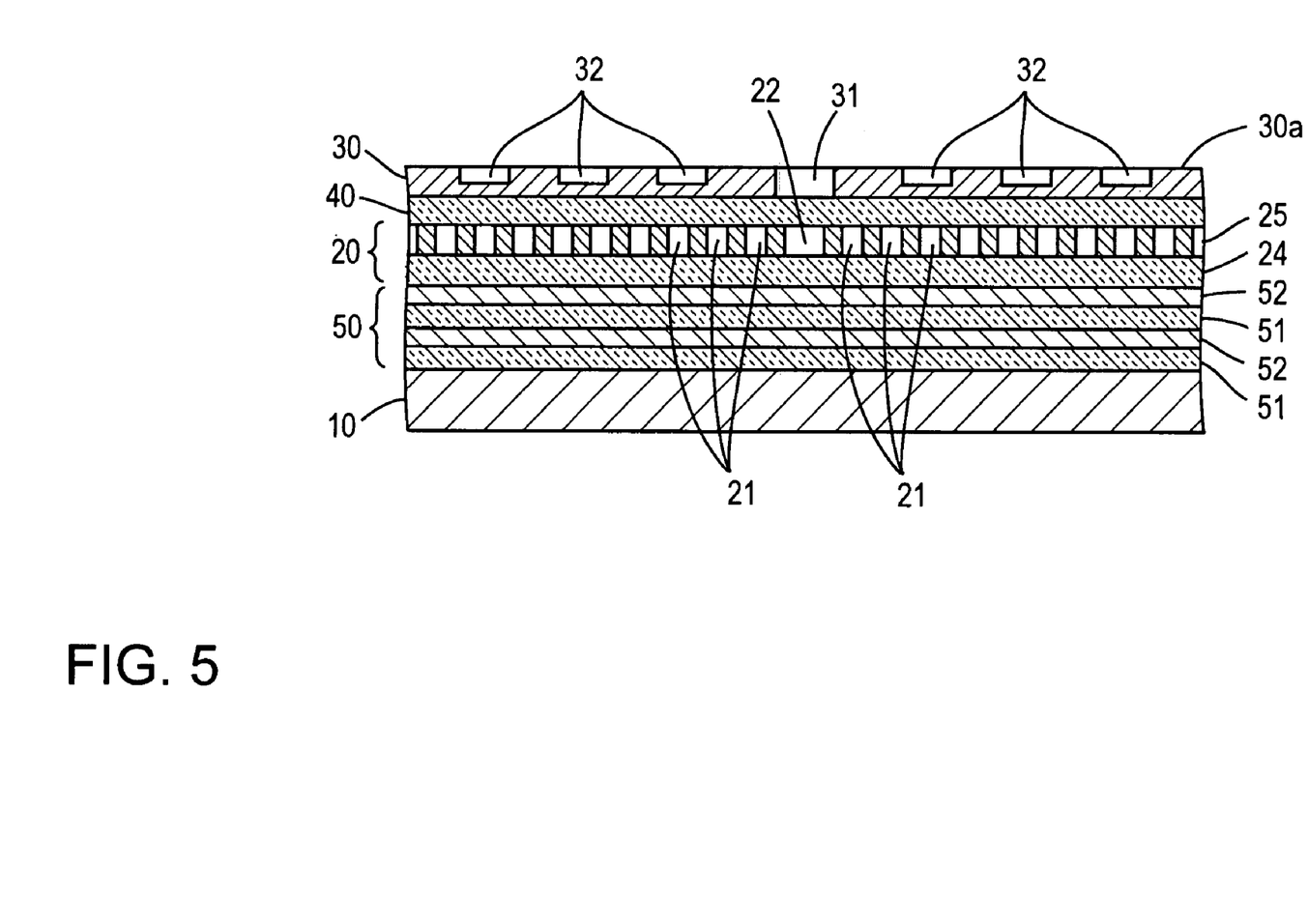
FIG. 5 is a cross-sectional view of an optical element according to an example 3 of the present invention.

FIG. 5 shows an arrangement of essential parts of an optical element according to the example 3 of the present invention in the same manner as FIG. 4. In this optical element, a mirror 50 (mirror structure) is disposed on the surface of a photonic crystal 20. The surface on which the mirror structure 50 is disposed is opposite to the surface over which the conductive film 30 is located. Thus, the photonic crystal 20 is interposed between the conductive film 30 and the mirror structure 50. The optical element was fabricated as described below.

A substrate 10 was a Si substrate. On the substrate 10, two SiO$_2$ layers 51 and two Si layers 52 were alternately deposited, thereby forming the mirror structure 50 having an alternate stack structure. The thickness of the SiO$_2$ layers 51 was 0.265 µm, and the thickness of the Si layer 52 was 0.106 µm. Then, as the photonic crystal 20, a SiO$_2$ layer 24 and a Si layer 25 were formed by sputtering. Resist patterning and etching were performed on the Si layer 25 as in the example 1, thereby forming the two-dimensional photonic crystal slab having the same structure as in the example 1.

The conductive film 30 having the same structure as in the example 1 was formed in the same manner and applied to the surface of the photonic crystal 20 in the same manner as in the example 1, thereby forming the optical element.

As in the examples 1 and 2, laser light having a wavelength of 1.587 µm was introduced into the opening 31 in the fabricated optical element, and the intensity of light coupled to the optical waveguide 23 was monitored with a photodiode 90. The result is shown in the table 1.

EXAMPLE 4

An optical element was fabricated in the same manner as in the example 1 except that the center of the point defect 22 in the photonic crystal 20 is slightly displaced from the center of the opening 30 in the conductive film 30.

In the case where the offset between the center of the point defect 22 and the center of the opening 31 was 0.23 μm, which was approximately a half of the diameter of the point defect 22, the intensity of light coupled to the optical waveguide 23 measured by monitoring in the same manner as in the example 1 was 15%. In addition, in the case where the offset was 0.47 μm, which is equal to the diameter of the point defect 22, the intensity of light coupled to the optical waveguide was 2%. Here, the term "offset" refers to the center-to-center distance between the center axis of the opening 31 and the center axis of the point defect 22.

COMPARISON EXAMPLE

A photonic crystal 20 was formed in the same manner as in the example 1, and an optical element without a conductive film 30 was fabricated.

Figure 6A:
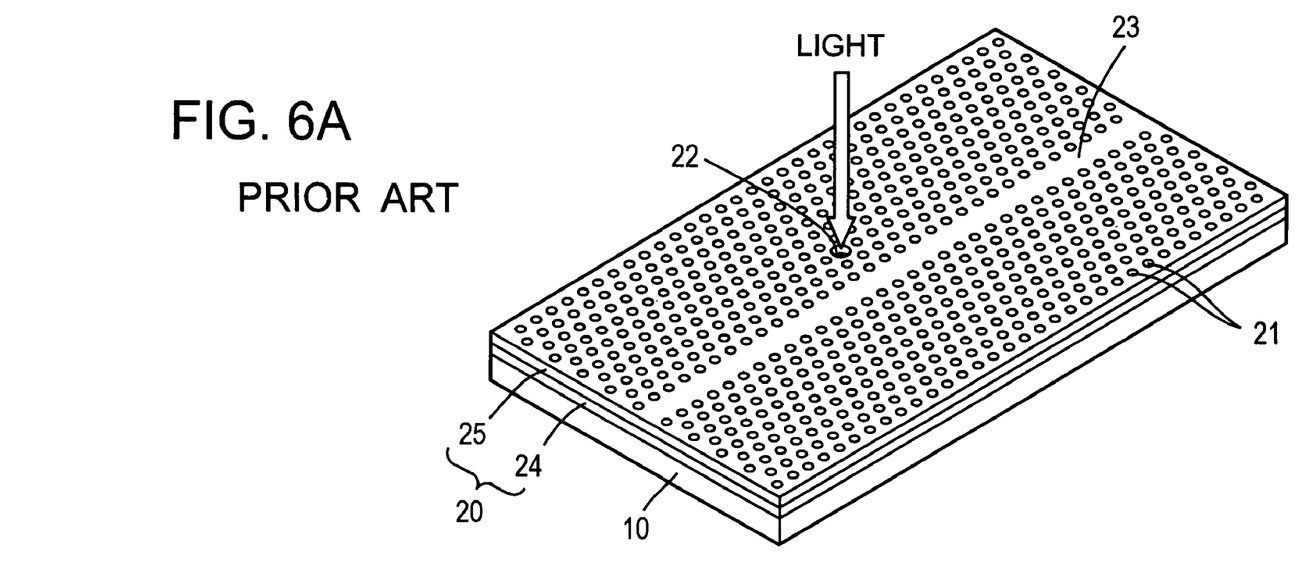
FIG. 6A is a perspective view of a conventional optical element (comparison example)
Figure 6B:
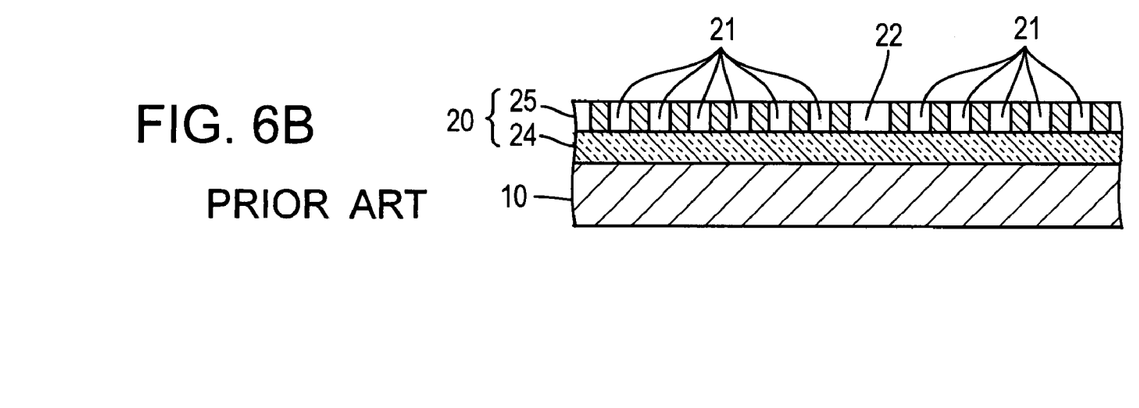
FIG. 6B is a partially enlarged cross-sectional view of the conventional optical element (comparison example)

FIG. 6A and FIG. 6B show the optical element without the conductive film 30. As in the example 1, laser light having a wavelength of 1.587 μm was introduced into an opening in the optical element (the point defect 22 in the photonic crystal 20 in this example), and the intensity of light coupled to the optical waveguide 23 was monitored with a photodiode 90. The result is shown in the table 1.

CONCLUSIONS FROM EXAMPLES

From the example 1 and the comparison example, the following conclusions can be derived.

Figure 7A:
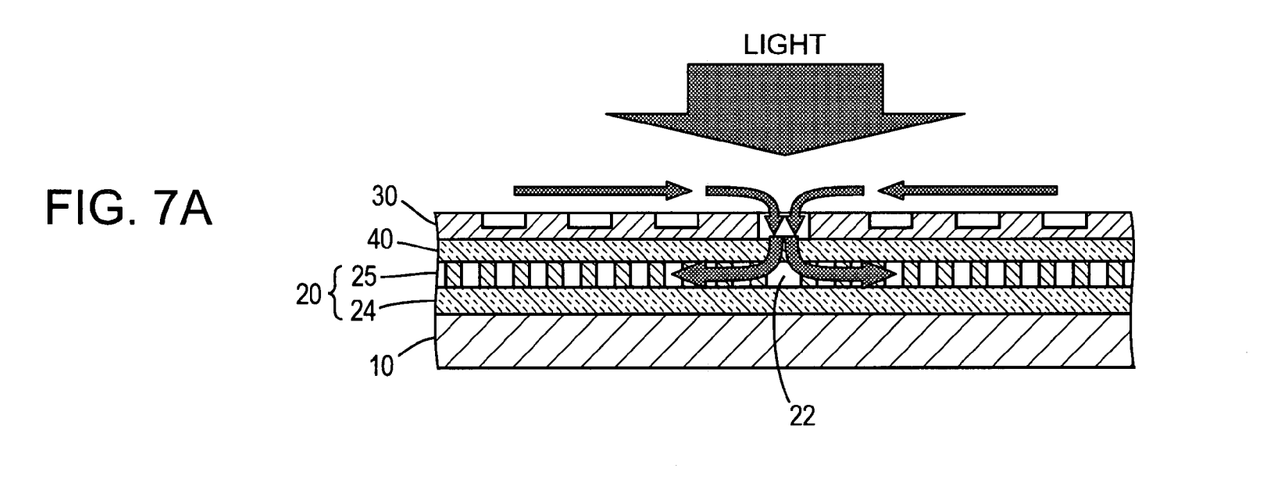
FIG. 7A is a diagram for illustrating the way the light incident on the optical element according to the example 1 of the present invention travels therein.
Figure 7B:
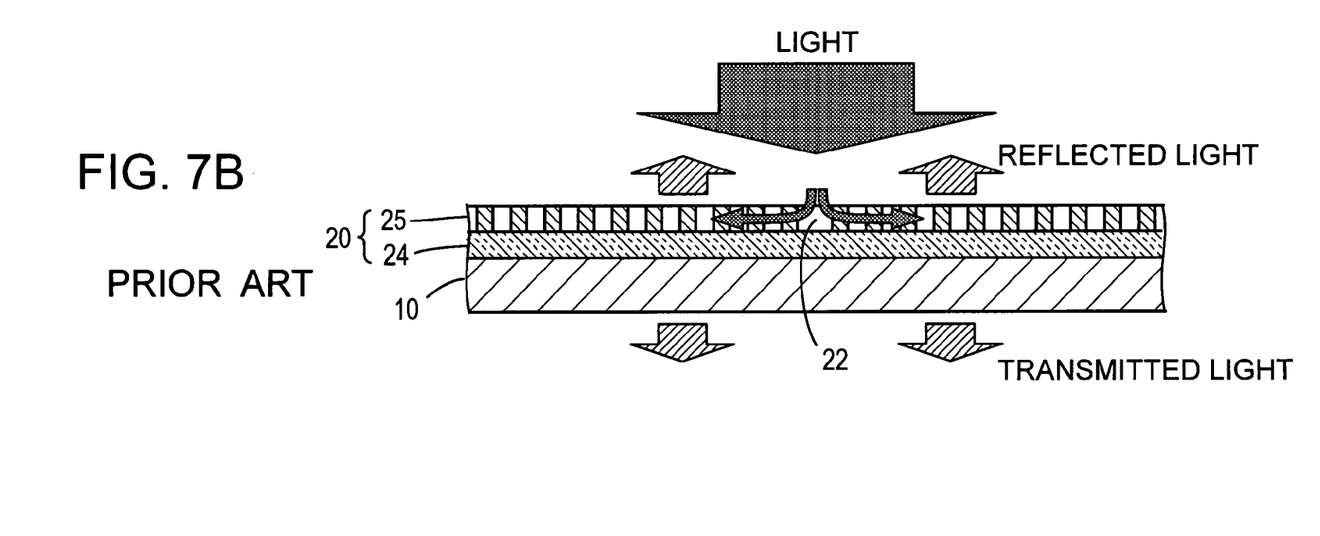
FIG. 7B is a diagram for illustrating the way the light incident on the conventional optical element travels therein.

The conductive film 30 significantly increases the intensity of light coupled to the optical waveguide 23 in the photonic crystal 20. The mechanism of this phenomenon can be considered as shown in FIG. 7A and FIG. 7B. As shown in FIG. 7B, if no conductive film is provided, light applied to the surface region of the photonic crystal 20 other than the point defect 22 is reflected from or transmitted through the optical element and is lost. To the contrary, as shown in FIG. 7A, if the conductive film 30 is provided, light is condensed to the point defect 22, so that the amount of light lost in the form of transmitted light or reflected light is significantly reduced.

In addition, from the example 1, it can be seen that, if the number of grooves 32 in the conductive film 30 is changed, the intensity of light coupled to the optical waveguide 23 does not significantly change, and thus, the number of grooves 32 does not need to be particularly limited.

In addition, it can be seen that the opening 31 whose diameter is larger than the diameter of the point defect 22 is more effective. In addition, it can be seen that the opening 31 whose diameter is smaller than the wavelength of the incident light is more effective. Furthermore, it can be seen that, if the diameter of the incident light beam is changed, the same effect can be achieved.

From comparison between the example 1 and the example 2, the following conclusion can be derived.

If grooves are formed in both the surfaces of the conductive film 30, light can be more efficiently coupled to the optical waveguide 23 in the photonic crystal 20. It can be considered that light reflected from the region near the point defect in the photonic crystal 20 is condensed again by the grooves 33 in the lower surface 30b of the conductive film 30 to enter the point defect 22, so that the optical coupling efficiency increases.

From comparison between the example 1 and the example 3, the following conclusion can be derived.

If the photonic crystal 20 is interposed between the conductive film 30 and the mirror structure 50, light can be more efficiently coupled to the optical waveguide 23 in the photonic crystal 20. It can be considered that light transmitted in the vicinity of the point defect 22 in the photonic crystal 20 is reflected back into the point defect 22.

If the function of the uneven structure described above and the general principle of optical coupling are considered, the followings are clear.

In the examples described above, as the defect structure for coupling light to the optical waveguide 23 in the photonic crystal 20, a single point defect 22 is formed in the photonic crystal 20. However, the defect structure is not limited thereto and may be a structure having an array of a plurality of point defects, for example. In this case, the diameter of a defect structure may be grasped as the following. For example, in the case of the outer circumference of a defect structure is like an elliptical shape, the diameter of a defect structure is corresponding to the length along the minor axis of the elliptical shape. For example, in the case of the outer circumference of a defect structure is like a rectangular shape, the diameter of a defect structure is corresponding to the short side of a rectangular shape. The center of a defect structure may be grasped as the center of gravity of the outer circumference. For example, in the case of the outer circumference of a defect structure is like an elliptical shape, the center of a defect structure is corresponding to the center of gravity of the elliptical shape. For example, in the case of the outer circumference of a defect structure is like a rectangular shape, the center of a defect structure is corresponding to the center of gravity of a rectangular shape.

The number of defect structure is not limited to one. A plurality of defect structure coupled optically to at least one light waveguide may be formed in a photonic crystal. The number of light waveguide is not limited to one. A plurality of light waveguides coupled optically to at least one defect structure may be formed in a photonic crystal.

In the examples described above, one opening 31 is formed in the conductive film 30. However, a plurality of openings 31 may be formed in a conductive film. In the case where a plurality of openings is formed in a conductive film, at least one uneven structure is formed around or in the vicinity of at least one opening. At least one uneven structure may be formed in the upper surface of a conductive film or in the lower surface of a conductive film. Or, at least one pair of an uneven structure formed in the one surface of a conductive film and an uneven structure formed in the other surface of a conductive film may be formed around or in the vicinity of a through opening.

In the examples described above, the photonic crystal is two-dimensional photonic crystal slab having air openings. However, a photonic crystal is not limited thereto and may be a structure having vertically arranged columns or a structure whose air openings are filled-in with materials having refractive indices different from that of other materials thereof, for example.

The optical element according to the present invention couples externally incident light to the optical waveguide in the photonic crystal with an extremely low loss. In addition, the optical element can achieve optical coupling within an extremely small region with an extremely low loss. Thus, an optical element that is reduced in size but improved in performance (reduced in optical loss) can be provided.

What is claimed is:

1. An optical element comprising:
   a conductive film having at least one through opening and at least one uneven structure which has recesses or projections, arranged in a predetermined period, formed in at least one of both surfaces thereof; and
   a photonic crystal,
   wherein each said uneven structure is formed around each said through opening,
   said photonic crystal has at least one optical waveguide and at least one defect structure optically coupled to at least one of said optical waveguides formed therein,
   said conductive film is disposed opposite to said photonic crystal, and each said through opening is opposite to each said defect structure, and
   a mirror disposed at a side of said photonic crystal opposite to a side where said conductive film is disposed.

2. The optical element according to claim 1, wherein said conductive film has at least one uneven structure in the each of the both surfaces of said conductive film, and at least one pair of said uneven structure formed in the one surfaces of said conductive film and said uneven structure formed in the other surface of said conductive film is formed around said through opening.

3. The optical element according to claim 1 or 2, wherein said through opening has a diameter smaller than the wavelength of incident light thereinto.

4. The optical element according to claim 3, wherein said through opening is a cylindrical through opening,
   said defect structure is a point defect, and
   said defect structure has a diameter smaller than the diameter of said through opening.

5. The optical element according to claim 4, wherein the offset between the center of said through opening and the center of said defect structure is smaller than the diameter of said defect structure.

6. The optical element according to claim 1 or 2, wherein said through opening is a cylindrical through opening,
   said defect structure is a point defect, and
   said defect structure has a diameter smaller than the diameter of said through opening.

7. The optical element according to claim 6, wherein the offset between the center of said through opening and the center of said defect structure is smaller than the diameter of said defect structure.

8. The optical element according to claim 1 or 2, wherein said through opening is disposed within a distance of a quarter of the period of said uneven structure, formed around the through opening concerned, from the center of the uneven structure concerned.

9. The optical element according to claim 1 or 2, wherein said uneven structure is concentric configuration, and the position of said through opening is at the center of the uneven structure concerned.

* * * * *